Patented Nov. 14, 1939

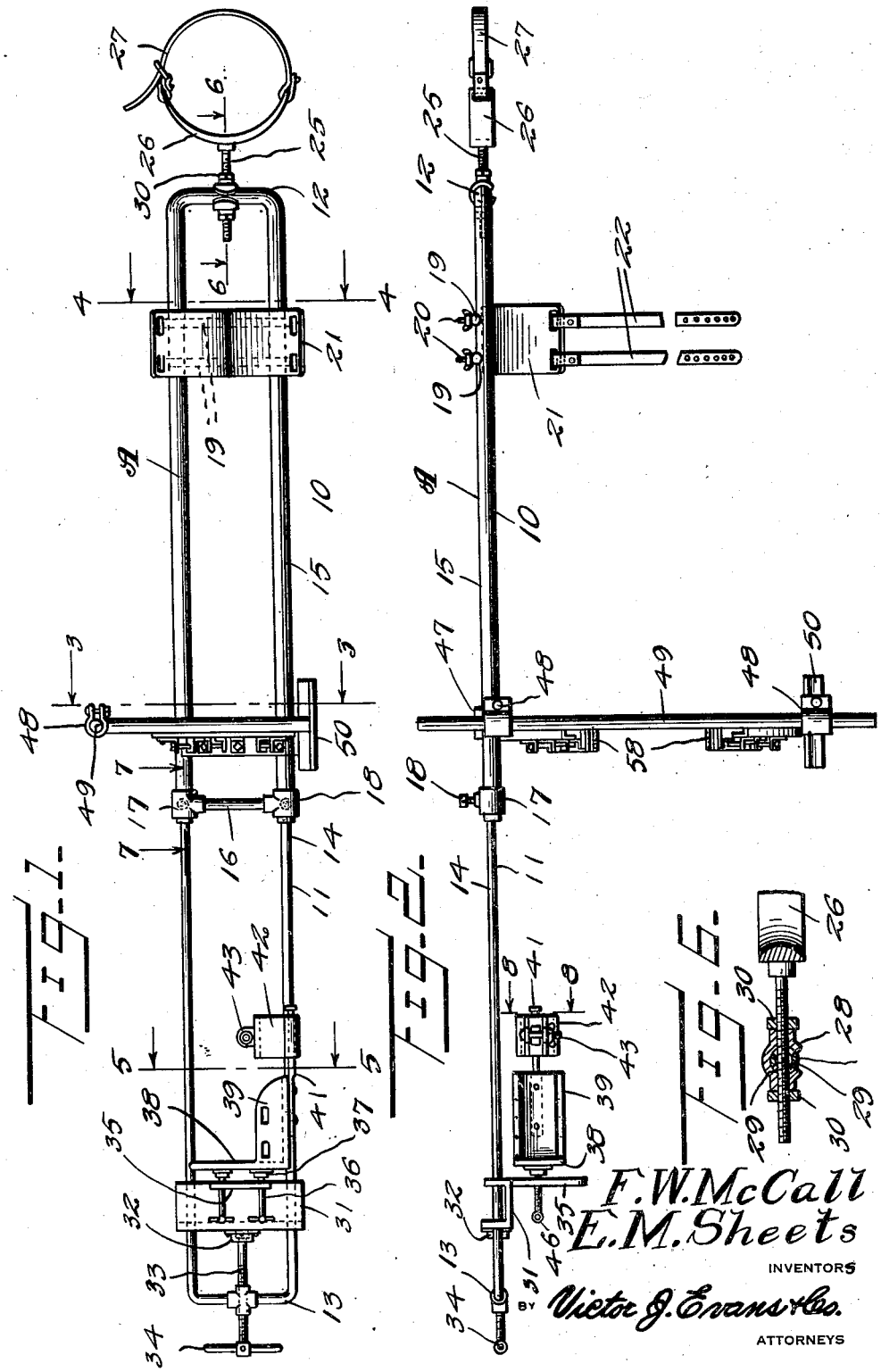

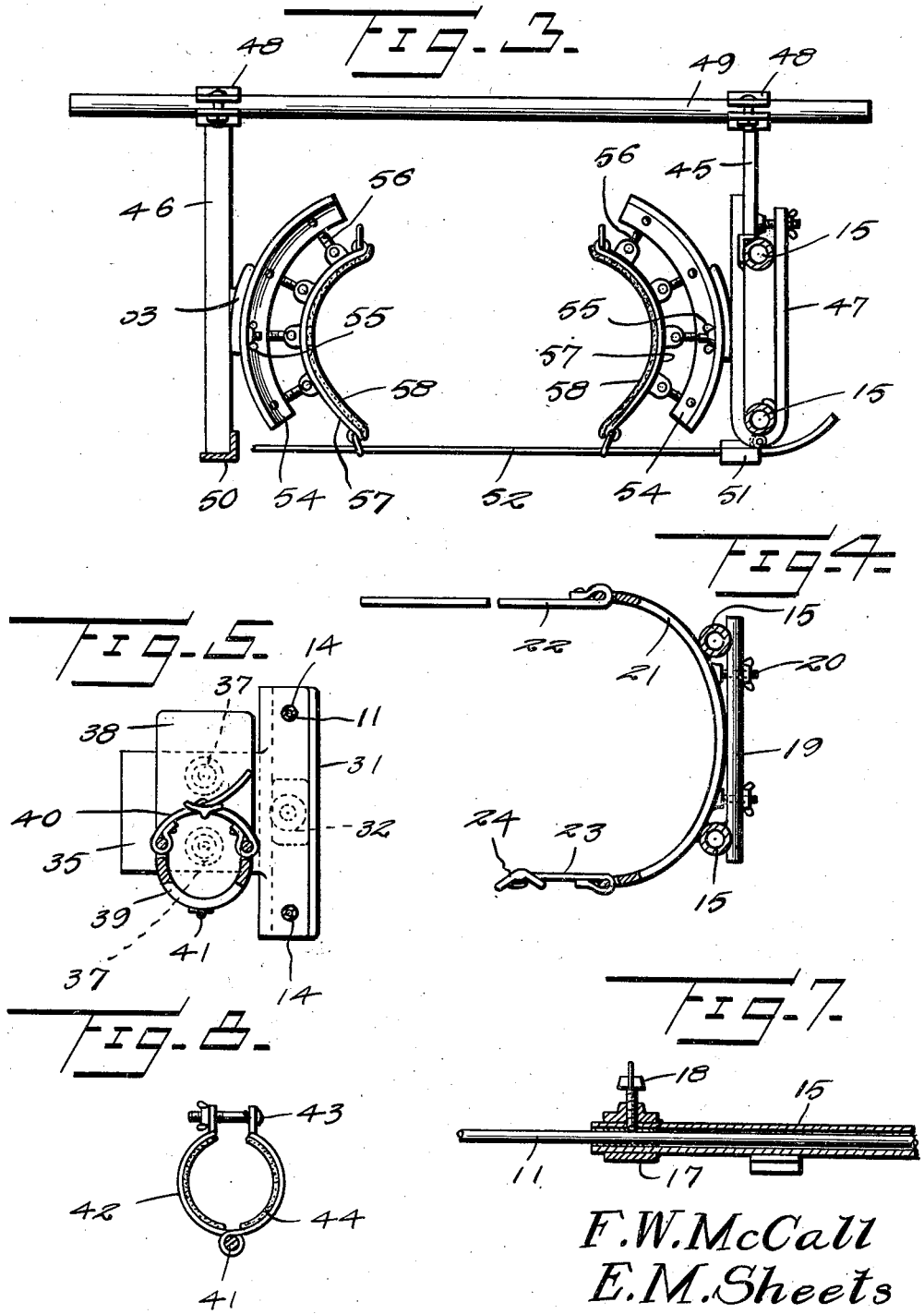

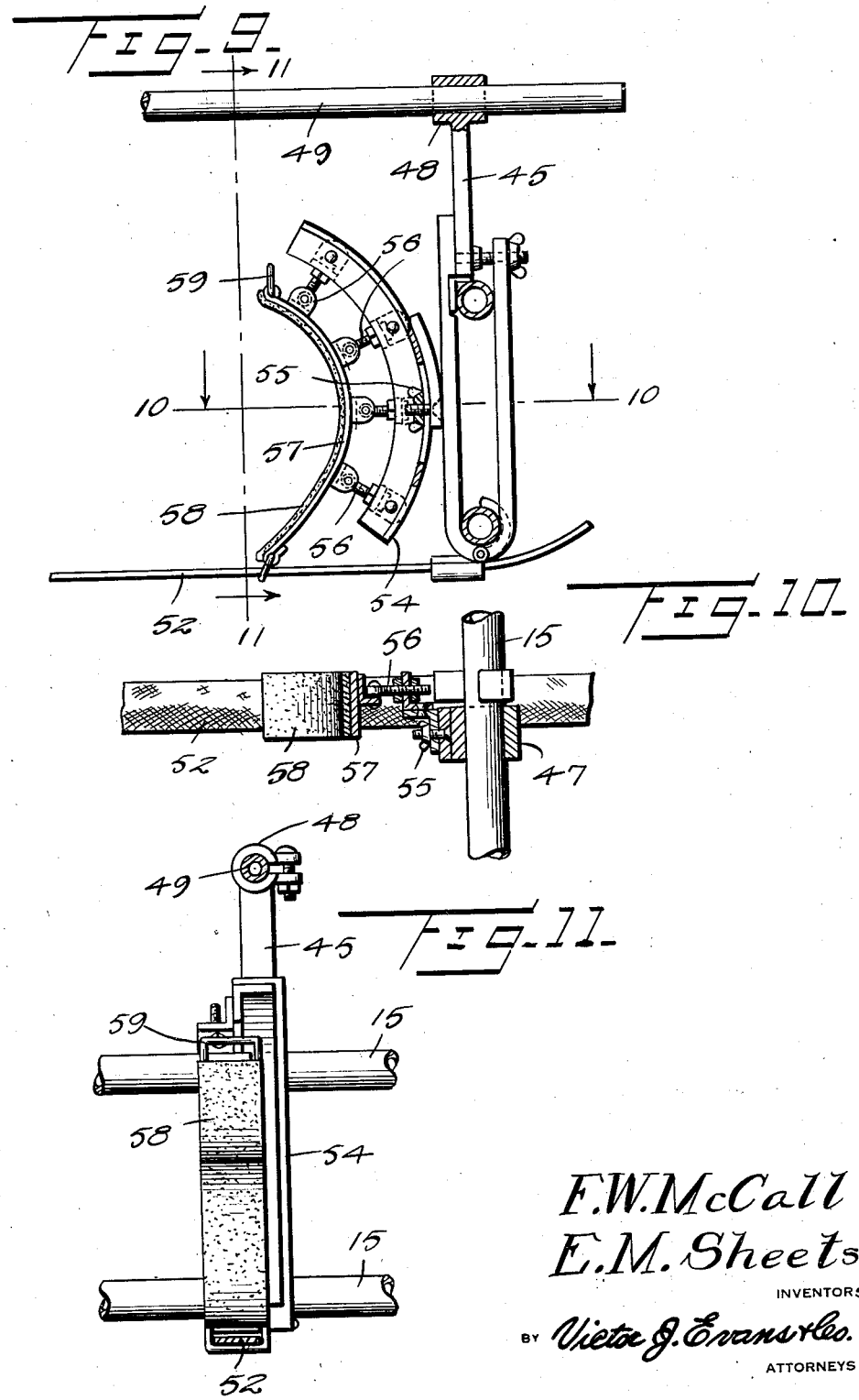

2,180,251

UNITED STATES PATENT OFFICE 2,180,251

FRACTURE SETTING APPLIANCE

Frederick W. McCall and Er Marcus Sheets, Miami, Fla.

Application February 28, 1938, Serial No. 193,147

6 Claims. (Cl. 128—87)

The invention relates to a fracture setting appliance and more particularly to an adjustable surgical splint or bone setting apparatus.

The primary object of the invention is the provision of an appliance or apparatus of this character, wherein fractures of the human leg, hip or pelvis can be mended in that the said appliance or apparatus will clearly facilitate and hasten the uniting of fractures without requiring the use of plaster casts thereby relieving the patient from discomfort present when using such cast.

Another object of the invention is the provision of an appliance or apparatus of this character, wherein the same is susceptible of innumerable adjustments so as to function as a splint or a bone setting medium and is adaptable for first-aid use, ambulance work, mine rescue or field service and in such use will avoid the shortening of the limb or limbs where the fracture occurs and enables immediate and accurate setting of such fracture in association with X-rays where necessary.

A further object of the invention is the provision of an appliance or apparatus of this character, which is comparatively simple in its construction, thoroughly reliable and efficient in operation, readily and easily adjusted for the setting of bone fractures, capable of application and removal with dispatch and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a side elevation of the appliance or apparatus constructed in accordance with the invention.

Figure 2 is a plan view thereof.

Figure 3 is a sectional view on an enlarged scale taken approximately at line 3—3 of Figure 1 looking in the direction of the arrows.

Figure 4 is a sectional view on the line 4—4 of Figure 1 looking in the direction of the arrows.

Figure 5 is a sectional view on the line 5—5 of Figure 1 looking in the direction of the arrows.

Figure 6 is a sectional view taken on the line 6—6 of Figure 1 looking in the direction of the arrows.

Figure 7 is a fragmentary sectional view on the line 7—7 of Figure 1 looking in the direction of the arrows.

Figure 8 is a sectional view on the line 8—8 of Figure 2 looking in the direction of the arrows.

Figure 9 is a fragmentary elevation of the parts shown in Figure 3 and being partly in section.

Figure 10 is a sectional view on the line 10—10 of Figure 9 looking in the direction of the arrows.

Figure 11 is a sectional view on the line 11—11 of Figure 9 looking in the direction of the arrows.

Similar reference characters indicate corresponding parts throughout the several views in the drawings.

Referring to the drawings in detail, the appliance or apparatus is denoted generally at A including an extensible main frame having the tubular substantially U-shaped companion sections 10 and 11, respectively, provided with the closed outer ends, one being indicated at 12 and the other at 13. The open inner ends of these sections 10 and 11 confront each other and the side limbs 14 of the said section 11 slidably fit within the side limbs 15 of the section 10 and in this fashion these sections are telescopically interfitted with each other, being a cross brace 16 at the inner open end of the frame 10 with T unions 17 fitting the side limbs 15 and tapped into these unions are set screws 18 locking the sections 10 and 11 adjusted with relation to each other.

Arranged integrally formed with the section 10 a distance removed from the outer closed end 12 is a pair of spaced cross bars 19 in which are accommodated nut-carrying bolt-like fasteners 20 fixedly projected from a chest saddle 21 of outwardly bowed yoke form and by this saddle at opposite ends has loosely engaged therewith companion straps 22 and 23, respectively, the latter strap being provided with a buckle 24 accommodating the strap 22 adjustably and in this manner through the use of the strap the chest of a patient can be embraced thereby in association with the saddle 21 when using the appliance or apparatus.

At the outer closed end 12 medially thereof is adjustably and rockingly fitted therewith the stem or shank 25 of an arm clutch 26 having associated therewith an adjustable shoulder strap 27 for the fastening of the crutch in place in the use of the appliance or apparatus, the stem or shank 25 being adjustable in a split circular-shaped clip-like member 28 and passes through opposed sector slots 29 in the end 12 providing clearances for the rocking action of said crutch while the stem or shank 25 carries lock nuts 30 to hold the same adjusted in the member 28 and also the latter against rocking movement at 55 the end 12 of the section 10 after adjustment has been had.

Fitting the frame 11 and slidable on its side limbs 14 is a carrier 31 being adjustable through coupling at 32 with an adjusting screw 33 threaded in the end 13 centrally thereof and at its outer end is provided with a cross handle 34. The carrier 31 is formed with an extension ear or wing 35 projecting laterally with respect to the section 11 and carrying adjusting screws 36 having swiveled couplings 37 with a foot piece 38 provided with a heel seat 39, the latter having adjustable holding straps 40 so that in this manner the foot of a patient can be fastened to the foot piece 38 with the heel in the seat 39 thereof. Carried by the seat 39 of the foot piece 38 is a hanger 41 for an ankle clamp 42 of the opening and closing hingedly connected sectional type provided with a fastener 43. This clamp 42 embraces the ankle of a patient and its sections are suitably padded or lined at 44 for protection to the skin of a patient to avoid injury in the use of the clamp.

Adapted for detachable fitting with the main frame of the appliance or apparatus A is a pelvis fitting device which comprises a pair of spaced columnar pieces 45 and 46, respectively, these being in parallelism with each other in their spaced relation and the piece 45 has built therewith a jaw clamp 47 for the main frame including the sections 10 and 11 while both pieces 45 and 46 at their upper ends are formed with split clamps 48 engaged upon a spread bar 49 so that by this connection the pieces 45 and 46 can be adjustably spaced with relation to each other, the piece 46 being formed at the other end with a crossed rest or bearing 50 while the end of the piece 45 opposite its clamp 48 is provided with wedging buckle 51 through which is trained a flexible surgical tie web 52. The pieces 45 and 46 at their inner sides are built with guides 53 for opposed racking segments 54, these being adjustably bolted at 55 to the guides 53 which through adjustable linkage 56 carry arched hip bows or pelvis clamps 57, these being padded or lined at 58 and each has swingable strap loops 59, those being next to the webs 52 accommodate the same while the other loops 59 are receptive of surgical ties common and well-known and being not shown.

The screw 33 is for tensioning the limb of a patient when the foot and the ankle of such patient are accommodated in the foot piece 38 and the ankle clamp 42 particularly where such patient has a hip fracture or when the limb is to be tensioned for bone setting therein.

The jaw clamp 47 enables the piece 45 in its association with the piece 46 of being separated from the main frame and also adjustment thereon.

The appliance or apparatus is susceptible of numerous adjustments to have the same properly applied and workable with different sizes of persons for bone setting or fracture mending without the aid or use of a plaster cast.

What is claimed is:

1. An apparatus of the kind described comprising an elongated frame including adjustably interfitted sections closed at their outer ends, an arm crutch adjustably fitting one closed end, a carrier on the frame and adjustably fitting the other closed end, a foot rest adjustably connected with the carrier and having a heel seat, an ankle clamp connected with the heel seat, a chest saddle on said frame and having adjustable securing straps, a spread bar transversely of the frame, a clamp adjustably connecting said bar to the frame and forming a columnar member, a second columnar member on said bar, segmental racking means on the columnar members, and flexible arched hip bows on the segments.

2. An apparatus of the kind described comprising an elongated frame including adjustably interfitted sections closed at their outer ends, an arm crutch adjustably fitting one closed end, a carrier on the frame and adjustably fitting the other closed end, a foot rest adjustably connected with the carrier and having a heel seat, an ankle clamp connected with the heel seat, a chest saddle on said frame and having adjustable securing straps, a spread bar transversely of the frame, a clamp adjustably connecting said bar to the frame and forming a columnar member, a second columnar member on said bar, segmental racking means on the columnar members, flexible arched hip bows on the segments, and means for adjustment of the last-named means.

3. An apparatus of the kind described comprising an elongated frame including adjustably interfitted sections closed at their outer ends, an arm crutch adjustably fitting one closed end, a carrier on the frame and adjustably fitting the other closed end, a foot rest adjustably connected with the carrier and having a heel seat, an ankle clamp connected with the heel seat, a chest saddle on said frame and having adjustable securing straps, a spread bar transversely of the frame, a clamp adjustably connecting said bar to the frame and forming a columnar member, a second columnar member on said bar, segmental racking means on the columnar members, flexible arched hip bows on the segments, means for adjustment of the racking means, and adjustable linkage included in the racking means.

4. An apparatus of the kind described comprising an elongated frame including adjustably interfitted sections closed at their outer ends, an arm crutch adjustably fitting one closed end, a carrier on the frame and adjustably fitting the other closed end, a foot rest adjustably connected with the carrier and having a heel seat, an ankle clamp connected with the heel seat, a chest saddle on said frame and having adjustable securing straps, a spread bar transversely of the frame, a clamp adjustably connecting said bar to the frame and forming a columnar member, a second columnar member on said bar, segmental racking means on the columnar members, flexible arched hip bows on the segments, means for adjustment of the racking means, adjustable linkage included in the said racking means, and loops carried by the said racking means for accommodating surgical ties.

5. An apparatus of the kind described comprising an elongated frame including adjustably interfitted sections closed at their outer ends, an arm crutch adjustably fitting one closed end, a carrier on the frame and adjustably fitting the other closed end, a foot rest adjustably connected with the carrier and having a heel seat, an ankle clamp connected with the heel seat, a chest saddle on said frame and having adjustable securing straps, a spread bar transversely of the frame, a clamp adjustably connecting said bar to the frame and forming a columnar member, a second columnar member on said bar, segmental racking means on the columnar members, flexible arched hip bows on the segments, means for adjustment of the racking means, adjustable linkage included in the racking means, loops carried by the racking means for accommodating surgical ties, and a buckle associated with the surgical ties.

6. An apparatus of the kind described comprising an elongated frame including adjustably interfitted sections closed at their outer ends, an arm crutch adjustably fitting one closed end, a carrier on the frame and adjustably fitting the other closed end, a foot rest adjustably connected with the carrier and having a heel seat, an ankle clamp connected with the heel seat, a chest saddle on said frame and having adjustable securing straps, a spread bar transversely of the frame, a clamp adjustably connecting said bar to the frame and forming a columnar member, a second columnar member on said bar, segmental racking means on the columnar members, flexible arched hip bows on the segments, means for adjustment of the racking means, adjustable linkage included in the racking means, loops carried by the racking means for accommodating surgical ties, a buckle for the surgical ties, guides included in the racking means, and racks adjustably connected with the guides and carrying said linkage.

FREDERICK W. McCALL.
ER MARCUS SHEETS.